United States Patent [19]

Jeppsen

[11] 4,021,401

[45] May 3, 1977

[54] BUILDING MATERIAL AND METHOD FOR MAKING SAME

[76] Inventor: Harvey I. Jeppsen, 1042 W. 9th Place, Mesa, Ariz. 85201

[22] Filed: Dec. 9, 1974

[21] Appl. No.: 530,681

[52] U.S. Cl. .............................. 260/37 N; 260/34.2
[51] Int. Cl.$^2$ ........................................ C08K 9/10
[58] Field of Search ............ 260/38, DIG. 40, 40 R, 260/37 N

[56] References Cited

UNITED STATES PATENTS

| | | | |
|---|---|---|---|
| 3,243,388 | 3/1966 | Ulfstedt | 260/37 N X |
| 3,846,366 | 11/1974 | Wallace | 260/37 N X |

*Primary Examiner*—Lewis T. Jacobs
*Assistant Examiner*—S. M. Person
*Attorney, Agent, or Firm*—Noel B. Hammond

[57] ABSTRACT

A method of bonding aggregates with resinous binder compositions to produce building materials of controlled strength, porosity and weight. Two types of building materials are made with this bonding method; one is a controlled strength, waterproof material, and the other is a controlled strength, porous material. The method employs either a phenolic resin binder composition in a semi-clear liquid form to maintain the natural coloration of the aggregate, or a furan resin binder composition which discolors the aggregate to a black or dark brown tone. In the controlled strength, waterproof product, the aggregate is gradated to provide a mixture of various particle sizes, including dust and fines, so that all the voids in the resulting product are filled. In the controlled strength porous product, the aggregate is gradated to provide a mixture of various particle sizes, excluding dust and fines, so voids in the product remain open, allowing moisture to pass through the product.

7 Claims, 2 Drawing Figures

BUILDING MATERIAL AND METHOD FOR MAKING SAME

FIELD OF THE INVENTION

The present invention relates to building materials made of aggregate, and more specifically to aggregate building materials which are bonded with resin rather than cement and water.

BACKGROUND OF THE INVENTION

Prior art aggregate products are generally controlled mixtures and admixtures of aggregates with a basic Portland cement binder mixed with water. These prior art products have extended curing times running into periods of several days and, in some instances, weeks. This curing time can be shortened by the use of furnaces or kilns in the drying process. Aggregates with cement as the bonding agent without additives have low tensile strength, low compressive strength and generally lack green strength. These strengths can be improved by additives, but the cost is increased. Prior art aggregate products are formed into coherent masses and poured into shapes at block, brick and precast panel installations under controlled conditions. Factory and inventory costs are high in order to keep sufficient quantities on hand to supply the market demand. Other typical deficiencies exhibited by prior art aggregate products are:

1. Though supposed to cure at room temperatures, they have had a lack of ability to rapidly attain stripping strength in molded products.
2. They have a high sensitivity to moisture absorption.
3. They require delicate handling for all green products.
4. Preformed products must be transported to job sites and many times suffer damage en route, causing rescheduling of on-site time schedules.
5. Factory, warehouse, and storage capital expenditures are high due to the necessity of maintaining large inventories.

Resinous binder compositions similar to those employed in the method of the present invention are used in the foundry arts. Foundry molds are made of sand or aggregates having a uniform particle size. The sand or aggregate is held together by a resin binder composition formed of three compounds: a binder, a resin, and a catalyst. Generally, one-half of one percent of resin binder compound to the total weight of the sand or aggregates used is needed in making foundry molds.

Generally, in making foundry molds, the binder is first mixed with the resin and then this mixture is mixed with the sand or aggregates. After the mold is formed, the exterior is sprayed with the catalyst to set the mold. After the mold has been used it is struck a hard blow which shatters the mold and the sand or aggregate reverts to its original form, allowing it to be reused.

Clearly, such methods as used in the foundry art are not suitable for making high, controlled strength building materials such as contemplated in the method of the present invention.

OBJECTS OF THE INVENTION

Accordingly, it is an object of the present invention to provide an improved method of making building materials whose basic composition is of aggregate without using cement and water.

Another object of the invention is the provision of a method of making an aggregate product that will form or set in a controlled time of from 30 seconds to several hours once the product is formed, and an end product that will fully cure in 24 hours.

Yet another object of the present invention is to provide a method of making a product that is waterproof, has high controlled compressive and tensile strengths and will retain the natural appearance of the aggregate used.

A further object of the invention is the provision of a method of making a controlled strength porous aggregate product.

A still further object of the present invention is to provide a method of making an aggregate product on the site of a construction project using portable equipment and using aggregates found on the site or native to the site.

An object of the invention is the provision of a method of making aggregate building materials in batches or in a continuous pour.

Another object of the present invention is to provide a method of making aggregate products so as to obtain rapid curing of the coherent masses at variable atmospheric conditions and temperatures, and yet retain its waterproof, high compressive strength and high tensile strength properties.

Yet another object of the invention is the provision of an aggregate product that will adhere and bond to any aggregate or admixture of aggregates commonly used in the building materials and products art.

A further object of the present invention is to provide a method of making aggregate materials in forms reinforced by including rebar and/or wire cast in the form to meet or maintain structural specifications.

A still further object of the invention is the provision of an aggregate product that can be cast in a shape or appearance required by scorings in the mold to effect appearances of brick, block, stump blocks, siding, stucco, smooth surface, and the like.

Another object of the present invention is to provide an aggregate product into which can be molded basic electrical services, or any other services required.

Yet another object of the invention is the provision of a method of making an aggregate material suitable for use as an overlay material for roadway and runway surfaces that is porous and allows rain water to drain therethrough, yet being rigid enough to support aircraft on runways and passenger cars and trucks on roadways.

SUMMARY OF THE INVENTION

In accordance with these and other objects of the invention, resin binder compositions are mixed with gradated aggregates of various sizes, including dust and fines, to produce controlled strength, waterproof aggregate products, and by eliminating the dust and fines in the mix, to produce a controlled strength porous aggregate product. Both waterproof and porous products use from 2 percent to 20 percent or more of the resin binder composition to the gross weight of the aggregate material used, an average of five percent being the predominant usage. The resin binder composition may be either a phenolic resin or a furan resin.

BRIEF DESCRIPTION OF THE DRAWING

The foregoing and other objects and features of the present invention can be more readily understood with reference to the following detailed description, taken in FIG. 1 illustrates a porous aggregate material in section to an enlarged scale.

DETAILED DESCRIPTION OF THE INVENTION

The present invention relates to a method of making a building material from aggregate without the use of water or cement, and to the material made by that method. It should be clearly understood that the term "material," or "building material," as used herein, means anything produced using an aggregate. Such products include, but are not limited to, underground tunnel walls and structures, waterway walls and dams, seamless pipelines for long-distance movement of liquids, marine vessels and underwater structures, decorative and sculptured products, foundations, floors, interior and exterior walls, roofs, curtain walls, decorative panels and columns, sidewalks, driveways, patio surfaces, sidewalls and floors of irrigation ditches or water viaducts, and overlay surfaces for airport runways, bridges, highways and road surfaces, and the like.

The term "aggregate," as used herein, means any rock product, sand, gravel, and includes items normally discarded as worthless, such as dust and fines (200 mesh or less), fly ash and slag such as smelter slag, open hearth slag, blast furnace slag, electric furnace slag, and the like.

The method of the present invention employs resinous binder compositions, rather than cement and water, to produce aggregate building materials of controlled strength, porosity and weight. Two types of building materials result from this bonding method. One is a controlled strength, waterproof material, and the other is a controlled strength, porous material.

In the controlled strength, waterproof material, the aggregate is gradated to provide a mixture of various particle sizes, including dust and fines, so that all the voids in the resulting product are filled. In the controlled strength, porous material, the aggregate is gradated to provide a mixture of various particle sizes, excluding dust and fines, so voids in the product remain open, allowing moisture to pass through the product.

Figure 1:
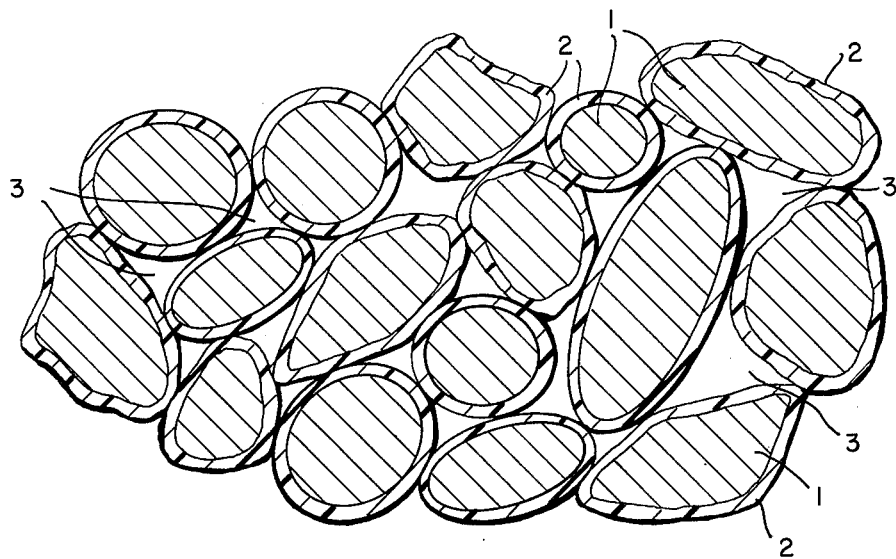

Referring now to FIG. 1 of the drawing, there is illustrated a porous aggregate material made in accordance with the invention, and shown in section and to an enlarged scale. The particles 1 of aggregate are of various sizes in this gradated mixture, and each individual particle 1 has a coating 2 of resin completely around it. Note that the bond in the aggregate material is between the coatings 2; that is, the coating 2 around each particle 1 adheres to the coatings 2 around other particles 1. Due to the absence of dust and fines, the material contains voids 3 which cause it to be porous.

Figure 2:
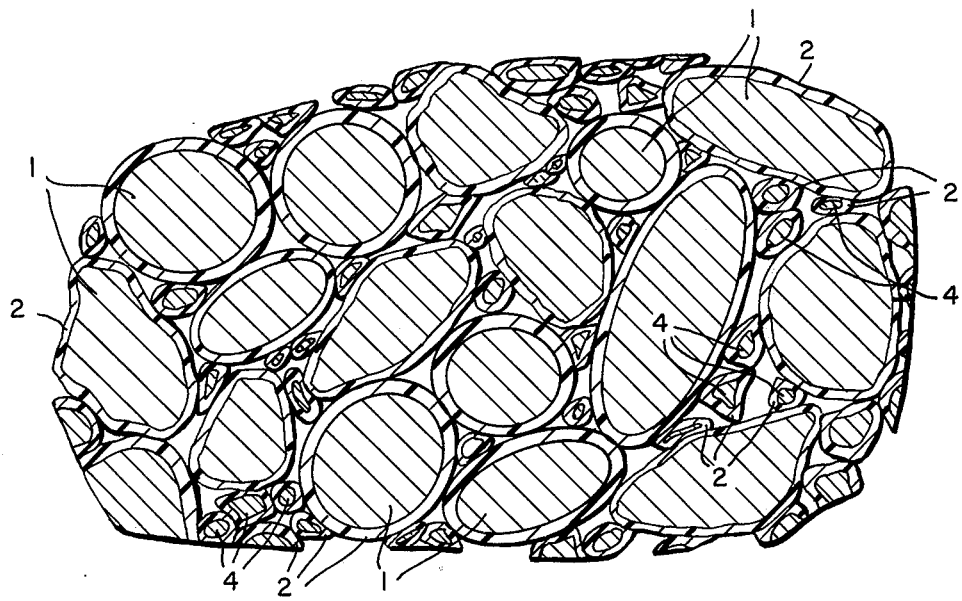
FIG. 2 illustrates waterproof aggregate material in section to an enlarged scale.

FIG. 2 illustrates a waterproof aggregate material, made in accordance with the invention. This material is also made of gradated aggregate particles 1, but in addition includes dust and fines 4 which fill the voids 3. Each speck of dust and fines 4 also has a coating 2 of resin completely around it which adheres to other coatings 2. Although there may be some minute spaces which are not completely filled by the dust and fines 4, they are sealed off from other such spaces so as to form isolated cells and water will not pass through the material.

Two types of resin binder compositions may be employed. One is a phenolic resin binder composition in a semi-clear liquid form which maintains the natural coloration of the aggregate. The other is a furan resin binder composition which discolors the aggregate to a black or dark brown tone.

The resin compositions are generally made available in three packages, comprising the resin component in one package, the binder or hardener component in the second package, and the catalyst in the third package. In the case of the phenolic resin binder composition, the resin component is an organic solvent solution of a non-aqueous phenolic resin. The binder or hardener component is a liquid polyisocyanate having at least two isocyanate groups per molecule. The catalyst is a tertiary amine. A full description of the chemical contents and properties of the phenolic resin binder composition may be found in U.S. Pat. No. 3,409,579, granted Nov. 5, 1968, or U.S. Pat. No. 3,676,392, granted July 11, 1972, and the furan resin binder composition is disclosed in Canadian Pat. No. 934,492, granted Sept. 25, 1973.

The method involves the mixing of the binder, resin, and catalyst with gradated aggregates to produce either a closely packed, permanently bonded, waterproof product, or a more loosely packed, permanently bonded porous product. The aggregates used must be crystalline in nature rather than absorbent such as clay or soil, because each particle of aggregate must be uniformly coated or encircled with the resin without absorbing any of the resin. Particles of clay or similar substances absorb bonding agent while being coated, thus using excess quantities of resin which results in excessive costs in the end product.

Best results are obtained by using a gradation of aggregate. The aggregate is a blend or mixture of large, medium and small particles (1/16 to ½ inch or larger), and where a waterproof product is needed, the mixture includes dust and fines (200 mesh or less) and fly ash. The dust and fines and fly ash are used to fill the voids in the mixed product to stop the passage or seepage of moisture. When dust and fines are not used, the voids remain, resulting in a porous product.

After the gradated aggregate has been selected and blended, it is mixed uniformly with the resin binding compound in two steps. The type of aggregate and its porosity must be known in order to determine the order in which the resin components are mixed with the aggregate. A particle of the more common sand is not as moisture-absorptive as that same particle if it is shattered or fractured. Soft aggregates such as marble, perlite or volcanic rock are much more absorptive of moisture than silica sand, slag, basalt, or porphyry.

It is found that better results in strength are obtained if the binder component and the catalyst are mixed with the aggregate first, and then the resin component is mixed with the resultant mix, when the aggregate is a soft aggregate, or if it is a shattered or fractured aggregate. If the aggregate is of a harder nature, or is a common aggregate in its natural state, then better results are obtained by first mixing the resin component with the aggregate, and then the binder component and catalyst are mixed with the resultant mix. The resinous binder composition must be mixed thoroughly with the aggregate so that the bonding agents uniformly coat each particle of aggregate, regardless of the size of the particle.

The amount of resin and binder used will vary with the aggregate being used. It has been found that the quantity of bonding agent used with any given aggregate is entirely predictable when repeated, and yet will be different when used with different aggregates. If the same results are required with repeated use of the same aggregate, then not only must the same aggregate and formula be used, but the aggregate must be in the same condition; i.e., size, natural or fractured, moisture content, and etc., within reasonable tolerances.

After the product is mixed and before it hardens, it is poured into a form or mold. The product is tamped or rolled to insure a uniform surface, either manually or by mechanical means. Too much pressure must be avoided to prevent the aggregate particles from fracturing, thus weakening the overall bonding strength. If aggregate particles fracture during the product-forming stage, a new surface is created that is not coated with the bonding agent, and the end product is correspondingly weaker.

By using the described method, the end product is thermosetting in ambient air having a temperature of from 20° to 120° F. The product will set in minutes or it can be moved from its form or mold, and it will reach its permanent hardness in 24 hours. Thus, it does not require the long curing time of most cement products.

It has been found that by varying the amount of catalyst, the setting time, or working time, can be controlled. For example, with an aggregate of crushed quarry limestone, 0.00977 percent of catalyst to the quantity of binder will give a working time of 13 minutes. By reducing the percentage of catalyst to 0.00586 percent, the working time will increase to 25 minutes. The working time can be controlled to have a duration of from 30 seconds to several hours, and yet the end product will be fully cured in 24 hours.

The building material of the present invention may be mixed in batches or by a continuous pour process. A mixing machine has been built to properly mix the materials using the methods as herein described with a mixing time of 32 seconds. These aggregate products can be mixed at a fixed location using stationary equipment, or on the site of the construction project using portable equipment, and using aggregates or slag found on the site, or native to the site.

The aggregate product of the present invention adheres and bonds to any aggregate or admixture of aggregates commonly used in the building materials and products art. It will adhere to other existing structures and thus become part of the existing structures. Reinforcing metal or rebar can be cast into the material, as well as electrical or other service, if desired. The aggregate product may be given the appearance of brick, block, stump blocks, siding, stucco, smooth surface, granular surface, or the like, by suitably scoring or forming the mold or form.

Certain additives and modifiers can be blended into the product to provide color stabilization, heat resistance, flame retardation and antioxidation without changing any of the chemical formulation or properties of the product. Sound transference is greatly reduced in the present product compared to products made with cement, and the insulation properties are superior to those of products made with cement. It has acoustical properties equal to or in excess of present day specifications, and resists the transmission of sound. It provides heat resistance to high temperatures and resistance to cold transference at low temperatures.

Because materials generally considered worthless, such as dust and fines, fly ash, slag, and the like, can be used in the process of the present invention, this invention has the advantage of converting these normally worthless materials into a saleable product.

The porous aggregate materials are particularly suitable for use as an overlay for roads, runways, and the like. It has been found that water on such surfaces is dangerous due to hydroplaning of wheels on wet surfaces. By coating roads and runways with a porous overlay made in accordance with the present invention, rainwater is allowed to drain therethrough, yet the coating is rigid and strong enough to support aircraft on runways, and trucks and passenger cars on roadways. The overlay material is spread on top of, and bonded to, existing runway and roadway surfaces.

Both waterproof and porous products use from two percent to twenty percent or more of the resin binder composition to the gross weight of the aggregate used, an average of five percent being the predominant usage. Many different aggregates have been bonded, and the following table gives the quantity of resins needed to bond certain classes of aggregates to obtain given tensile and compressive strengths. For example, 50% crushed quarry limestone and 50% silica blo sand when mixed with 4% binder, 4% resin and .00625% of catalyst produce a material having a compressive strength of 3,980 lbs. per square inch and a tensile strength of 653 lbs. per square inch.

It is obvious that many variations may be made in the products and processes of this invention without departing from the spirit and scope thereof. The foregoing detailed description has been given for clearness of understanding only, and no unnecessary limitations should be understood therefrom.

TABLE

| MIX NO. | % | AGGREGATE | PERCENT CATALYST | WORKING TIME | COMPRESSIVE STRENGTH (LBS./SQ. IN.) | TENSILE STRENGTH (LBS./SQ. IN.) | POROSITY |
|---|---|---|---|---|---|---|---|
| 1 | 50 | Argentum smelter slag, air cooled, mixed with | .00703 / | 12 min. | 2,980 | 845 | porous |
|  | 50 | Natural pea gravel, ¼" 3% Binder 3% Resin | .00633 / | 22 min. |  |  |  |
| 2 | 100 | Argentum smelter slag, air cooled. 3% Binder 3% Resin | .00781 / .00528 / | 12 min. 25 min. | 1,560 | 575 | porous |
| 3 | 50 | Argentum smelter slag, air cooled, mixed with | .00703 / | 12 min. | 3,210 | 772 | porous |
|  | 50 | Silica blo-sand 3% Binder 3% Resin | .00352 / | 30 min. |  |  |  |
| 4 | 38.5 | Argentum smelter slag, air cooled, mixed with | .00703 / | 12 min. | 3,500 |  | porous |

TABLE-continued

| MIX NO. | % | AGGREGATE | PERCENT CATALYST | | WORKING TIME | COMPRESSIVE STRENGTH (LBS./SQ. IN.) | TENSILE STRENGTH (LBS./SQ. IN.) | POROSITY |
|---|---|---|---|---|---|---|---|---|
| | 31.3 | Silica blo-sand and | .00547 | / | 20 min. | | | |
| | 31.2 | Natural pea gravel, ¼″ | | | | | | |
| | | 3% Binder | | | | | | |
| | | 3% Resin | | | | | | |
| 5 | 33.3 | Crushed quarry limestone, mixed with | .00977 | / | 13 min. | 6,060 | 1,035 | waterproof |
| | 33.3 | Silica blow sand and | .00586 | / | 25 min. | | | |
| | 33.4 | Natural pea gravel ¼″ | | | | | | |
| | | 4% Binder | | | | | | |
| | | 4% Resin | | | | | | |
| 6 | 50 | Crushed quarry limestone mixed with | .00977 | / | 13 min. | 3,980 | 653 | waterproof |
| | 50 | Silica blo-sand | .00586 | / | 25 min. | | | |
| | | 4% Binder | | | | | | |
| | | 4% Resin | | | | | | |
| 7 | 33.3 | Open hearth slag mixed with | | | | | | |
| | 33.3 | Crushed quarry limestone and | .00590 | / | 3 min. | 2,490 | | porous |
| | 33.4 | Natural pea gravel, ¼″ | .00370 | / | 25 min. | | | |
| | | 3% Binder | | | | | | |
| | | 3% Resin | | | | | | |
| 8 | 50 | Open hearth slag mixed with | | | | | | |
| | 20 | Silica blow sand and | .00650 | / | 3 min. | 4,550 | 794 | waterproof |
| | 30 | Natural pea gravel, ¼″ | .00474 | / | 30 min. | | | |
| | | 3% Binder | | | | | | |
| | | 3% Resin | | | | | | |
| 9 | 50 | Open hearth slag mixed with | | | | | | |
| | 50 | Silica blo-sand | .00451 | / | 3 min. | 5,770 | 941 | waterproof |
| | | 4% Binder | .00419 | / | 10 min. | | | |
| | | 4% Resin | | | | | | |
| 10 | 66.6 | Blast furnace slag, air cooled, mixed with | .00606 | / | 6 min. | 3,200 | 962 | porous |
| | 33.4 | Silica blo-sand | .00273 | / | 1 hour | | | |
| | | 3% Binder | | | | | | |
| | | 3% Resin | | | | | | |
| 11 | 100 | White marble | .00586 | / | 18 min. | 2,900 | | porous |
| | | 3% Binder | .00694 | / | 6 min. | | | |
| | | 3% Resin | | | | | | |
| 12 | 50 | Blast furnace slag, air cooled, mixed with | .00586 | / | 6 min. | 2,400 | | porous |
| | 50 | white marble | .00584 | / | 20 min. | | | |
| | | 3% Binder | | | | | | |
| | | 3% Resin | | | | | | |
| 13 | 33.3 | Blast furnace slag, air cooled, mixed with | .00586 | / | 6 min. | 3,460 | | porous |
| | 66.7 | White marble | .00504 | / | 20 min. | | | |
| | | 4% Binder | | | | | | |
| | | 4% Resin | | | | | | |
| 14 | 50 | Blast furnace slag, air cooled, mixed with | .00606 | / | 6 min. | 6,380 | 845 | waterproof |
| | 50 | Natural pea, gravel ⅜″ | .00461 | / | 30 min. | | | |
| | | 4% Binder | | | | | | |
| | | 4% Resin | | | | | | |
| 15 | 66.7 | Blast furnace slag, air cooled, mixed with | .00606 | / | 6 min. | 5,860 | 962 | waterproof |
| | 33.3 | Silica blo-sand | .00461 | / | 30 min. | | | |
| | | 4% Binder | | | | | | |
| | | 4% Resin | | | | | | |
| 16 | 57.1 | Blast furnace slag, air cooled, mixed with | .00606 | / | 6 min. | 6,800 | | waterproof |
| | 21.4 | Natural silica and | .00491 | / | 25 min. | | | |
| | 21.5 | Silica blow-sand | | | | | | |
| | | 4% Binder | | | | | | |
| | | 4% Resin | | | | | | |
| 17 | 39 | Electric furnace slag, mixed with | | | | | | |
| | 39 | Natural Silica and | .00703 | / | 12 min. | 4,390 | | waterproof |
| | 22 | Natural pea gravel, ⅜″ | .00612 | / | 25 min. | | | |
| | | 3% Binder | | | | | | |
| | | 3% Resin | | | | | | |
| 18 | 33.4 | Electric furnace slag mixed with | | | | | | |
| | 33.3 | Silica blo-sand and | .00703 | / | 12 min. | 7,770 | 1,175 | waterproof |
| | 33.3 | Natural pea gravel ⅜″ | .00612 | / | 25 min. | | | |
| | | 3% Binder | | | | | | |
| | | 3% Resin | | | | | | |
| 19 | 33.3 | Natural silica mixed with | | | | | | |
| | 33 | Silica blo-sand and | .00625 | / | 12 min. | 7,060 | 1,155 | waterproof |
| | 34 | Natural pea gravel | .00638 | / | 10 min. | | | |
| | | 3% Binder | | | | | | |
| | | 3% Resin | | | | | | |
| 20 | 50 | Electric furnace slag mixed with | .00694 | / | 5 min. | 4,480 | 751 | waterproof |
| | 50 | Fractured igneous rock | .00555 | / | 25 min. | | | |
| | | 3.5% Binder | | | | | | |
| | | 3.5% Resin | | | | | | |
| 21 | 50 | Natural silica mixed with | | | | | | |
| | 50 | Silica blo-sand | .00625 | / | 12 min. | 6,030 | 928 | waterproof |
| | | 3% Binder | .00512 | / | 30 min. | | | |
| | | 3 % Resin | | | | | | |

TABLE-continued

| MIX NO. | % | AGGREGATE | PERCENT CATALYST | WORKING TIME | COMPRESSIVE STRENGTH (LBS./SQ. IN.) | TENSILE STRENGTH (LBS./SQ. IN.) | POROSITY |
|---|---|---|---|---|---|---|---|
| 22 | 64.1 | Scoria mixed with | | | | | |
| | 10.3 | Silica blo-sand and | .00625 / | 10 min. | 3,720 | | porous |
| | 25.6 | Natural pea gravel, ¼" | .00531 / | 25 min. | | | |
| | | 10% Binder | | | | | |
| | | 10% Resin | | | | | |
| 23 | 33.3 | Natural silica mixed with | | | | | |
| | 33.4 | Silica blo-sand and | .00625 / | 12 min. | 6,580 | 1,155 | waterproof |
| | 33.3 | Natural pea gravel, ¼" | .00512 / | 30 min. | | | |
| | | 3.5% Binder | | | | | |
| | | 3.5% Resin | | | | | |
| 24 | 25 | Natural silica mixed with | | | | | |
| | 50 | Silica blo-sand and | .00625 / | 12 min. | 6,680 | | waterproof |
| | 25 | Natural pea gravel ¼" | .00512 / | 30 min. | | | |
| | | 3.5% Binder | | | | | |
| | | 3.5% Resin | | | | | |
| 25 | 50 | Silica blo-sand mixed with | | | | | |
| | 50 | Natural pea gravel | .00625 / | 12 min. | 6,790 | 1,252 | waterproof |
| | | 3.5% Binder | | | | | |
| | | 3.5% Resin | | | | | |
| 26 | 50 | Electric furnace slag mixed with | .00703 / | 12 min. | 6,220 | | waterproof |
| | 50 | Natural pea gravel, ¼" | .00547 / | 20 min. | | | |
| | | 3.5% Binder | | | | | |
| | | 3.5% Resin | | | | | |
| 27 | 51.1 | Scoria mixed with | | | | | |
| | 24.5 | Silica blo-sand with | .00625 / | 10 min. | 1,840 | | waterproof |
| | 24.4 | Natural pea gravel, ¼" | .00531 / | 25 min. | | | |
| | | 3.5% Binder | | | | | |
| | | 3.5% Resin | | | | | |
| 28 | 80 | Igneous fractured rock mixed with | .00659 / | 5 min. | 3,040 | | waterproof |
| | 20 | Natural silica | .00494 / | 30 min. | | | |
| | | 2.5% Binder | | | | | |
| | | 2.5% Resin | | | | | |
| 29 | 85 | Igneous fractured rock mixed with | .00659 / | 5 min. | 1,560 | | waterproof |
| | 15 | Natural silica | .00494 / | 30 min. | | | |
| | | 2% Binder | | | | | |
| | | 2% Resin | | | | | |
| 30 | 19 | Natural silica mixed with | | | | | |
| | 81 | Natural pea gravel, ⅜" | .00625 / | 12 min. | 3,670 | | waterproof |
| | | 3% Binder | .00531 / | 25 min. | | | |
| 31 | 32.4 | Electric furnace slag, granulated, mixed with | .00703 / | 12 min. | 3,310 | | waterproof |
| | 67.6 | Natural pea gravel, ⅜" | .00352 / | 30 min. | | | |
| | | 3% Binder | | | | | |
| | | 3% Resin | | | | | |

What is claimed is:

1. The method of making a waterproof aggregate material comprising the steps of:
   selecting non-absorbent crystalline aggregate material of different particle sizes including large, medium, small and dust and fines of 200 mesh or less,
   blending the selected aggregate material into a gradated aggregate mixture,
   mixing a liquid polyisocyanate binder with a liquid tertiary amine catalyst,
   mixing the combined binder and catalyst with the gradated aggregate mixture,
   mixing a liquid phenolic resin with the combined binder, catalyst, and gradated aggregate until each individual particle is completely coated with the phenolic resin components,
   pouring the resin-coated gradated aggregate into a form before it hardens,
   tamping the resin-coated gradated aggregate in the form before it hardens, and
   removing the resin-coated gradated aggregate from the form after it hardens.

2. The method of making a porous aggregate material comprising the steps of:
   selecting non-absorbent crystalline aggregate material of different particle sizes including large, medium and small but excluding dust and fines,
   blending the selected aggregate material into a gradated aggregate mixture,
   mixing a liquid polyisocyanate binder with a liquid tertiary amine catalyst,
   mixing the combined binder and catalyst with the gradated aggregate mixture,
   mixing a liquid phenolic resin with the combined binder, catalyst, and gradated aggregate until each individual particle is completely coated with the phenolic resin components,
   pouring the resin-coated gradated aggregate into a form before it hardens,
   tamping the resin-coated gradated aggregate in the form before it hardens, and
   removing the resin-coated gradated aggregate from the form after it hardens.

3. The method of making a waterproof aggregate material comprising the steps of:
   selecting non-absorbent crystalline aggregate material of different particle sizes including large, medium, small and dust and fines of 200 mesh or less,
   blending the selected aggregate material into a gradated aggregate mixture,
   mixing a liquid binder with a liquid catalyst,
   mixing the combined binder and catalyst with the gradated aggregate mixture,
   mixing a liquid resin with the combined binder, catalyst and gradated aggregate until each individual particle is completely coated with the resin components, pouring the resin-coated gradated aggregate into a form before it hardens, tamping the resin-coated graduated aggregate in the form before it hardens, and removing the resin-coated gradated aggregate from the form after it hardens.

4. The method of making a porous aggregate material comprising the steps of:

selecting non-absorbent crystalline aggregate material of different particle sizes including large, medium and small but excluding dust and fines, blending the selected aggregate material into a gradated aggregate mixture, mixing a liquid binder with a liquid catalyst, mixing the combined binder and catalyst with the gradated aggregate mixture, mixing a liquid resin with the combined binder, catalyst and gradated aggregate until each individual particle is completely coated with the resin components, pouring the resin-coated gradated aggregate into a form before it hardens, tamping the resin-coated gradated aggregate in the form before it hardens, and removing the resin-coated gradated aggregate from the form after it hardens.

5. The method of making a waterproof aggregate material comprising the steps of:

blending a gradated aggregate mixture of different particle sizes including large, medium, small and dust and fines of 200 mesh or less made up of 33.3% crushed quarry limestone, 33.3% of silica blow sand and 33.4% of ¼ inch natural pea gravel, mixing a weight equal to 4% of the weight of the aggregate of a liquid polyisocyanate binder with 0.00586% to 0.00977% of a liquid tertiary amine catalyst, mixing the combined binder and catalyst with the gradated aggregate mixture, mixing a weight equal to 4% of the weight of the aggregate of a liquid phenolic resin with the combined binder, catalyst and gradated aggregate until each individual particle is completely coated with the phenolic resin components, pouring the resin-coated gradated aggregate into a form before it hardens, and tamping the resin-coated gradated aggregate in the form before it hardens.

6. The method of making a porous aggregate material comprising the steps of:

blending a gradated aggregate mixture of different particle sizes including large, medium and small, but excluding dusts and fines, made up of 64.1% scoria, 10.3% silica blow sand and 25.6% of ¼ inch natural pea gravel, mixing a weight equal to 10% of the weight of the aggregate of a liquid polyisocyanate binder with 0.00531% to 0.00625% of a liquid tertiary amine catalyst, mixing the combined binder and catalyst with the gradated aggregate mixture, mixing a weight equal to 10% of the weight of the aggregate of a liquid phenolic resin with the combined binder, catalyst and gradated aggregate until each individual particle is completely coated with the phenolic resin components, pouring the resin-coated gradated aggregate into a form before it hardens, and tamping the resin-coated gradated aggregate in the form before it hardens.

7. A waterproof aggregate material comprising:

a gradated non-absorbent crystalline aggregate mixture of various particle sizes including large, medium and small, varying from ½ to 1/16 inch, said mixture including dust and fines of 200 mesh and smaller to fill the voids therein, and phenolic resin coating each individual particle, including said dust and fines, to bind said aggregate mixture into a solid mass, said phenolic resin consisting of a polyisocyanate binder component, a phenolic resin component and a tertiary amine catalyst.

* * * * *